United States Patent [19]

Bennett

[11] Patent Number: 4,480,784
[45] Date of Patent: Nov. 6, 1984

[54] HOT WATER CUTOFF SAFETY VALVE FOR SHOWERS

[76] Inventor: Milton D. Bennett, 2218 Farringdon Rd., Baltimore, Md. 21209

[21] Appl. No.: 500,999

[22] Filed: Jun. 3, 1983

[51] Int. Cl.³ .............................................. G05D 23/08
[52] U.S. Cl. .................................. 236/93 B; 137/457; 138/46; 236/93 R
[58] Field of Search .......................... 236/93 R, 93 B; 137/457, 512.15, 512.4, 843; 138/26, 45, 46

[56] References Cited

U.S. PATENT DOCUMENTS

| | | | |
|---|---|---|---|
| 2,109,628 | 3/1938 | Alban et al. | 236/93 R |
| 2,673,687 | 3/1954 | Alban et al. | 236/93 R |
| 2,763,433 | 9/1956 | Hill | 236/93 R |
| 2,910,093 | 10/1959 | Dahl | 138/46 |
| 3,313,312 | 4/1967 | Meese . | |
| 3,659,624 | 5/1972 | Kelly . | |
| 3,690,336 | 9/1972 | Drum . | |
| 3,720,220 | 3/1973 | McMath . | |
| 3,895,646 | 7/1975 | Howat | 236/93 R X |
| 3,930,613 | 1/1976 | Place | 236/48 R |
| 4,143,812 | 3/1979 | Fortune | 236/93 R X |
| 4,262,844 | 4/1981 | Sekiya | 236/93 B X |

*Primary Examiner*—William E. Tapolcai
*Attorney, Agent, or Firm*—John F. McClellan, Sr.

[57] ABSTRACT

A hot-water safety valve for preventing scalding of children and invalids when cold water supply to a mixing valve for a shower is interrupted, includes a thermostatic cup freely resting on a perforate transverse platform in a supply pipe upstream from a shower nozzle when the water temperature exceeds a predetermined amount the thermostatic cup expands to constrict flow but always leaves a drip to permit flow of cooler water to be sensed and reset or re-open the valve for flow restoration.

1 Claim, 7 Drawing Figures

HOT WATER CUTOFF SAFETY VALVE FOR SHOWERS

FIELD OF THE INVENTION

This invention relates generally to valves and specifically to a novel safety hot water flow reducing system to prevent scalding injuries to humans in showers.

BACKGROUND OF THE INVENTION

The following U.S. patents are known:

U.S. Pat. No. 3,313,312 issued April 11, 1967 to W. E. Weese, disclosed a resettable immersion type thermally responsive fluid valve; this evidently would be able to shut off hot water if suitable material were used;

U.S. Pat. No. 3,659,624 issued May 2, 1972 to W. M. Kelly, disclosed another form of valve with fusible link and external sensor;

U.S. Pat. Nos. 3,690,336 issued Sept. 12, 1972 to E. W. Drum and 2,720,220 issued Mar. 13, 1973 to J. A. McMatch, disclosed two forms of thermally responsive ball type shut-off valves. With suitable material substitution either of these valves could evidently be used to set a limit on temperature of water flowing though them.

SUMMARY OF THE INVENTION

Small children, particularly when playing with smaller children in a shower have been known to set or to re-set shower temperatures too high, causing severe injuries and sometimes deaths. Sometimes sudden changes in water temperature occur, as when demand reduces cold water supply, or when a mixing valve fails. Invalids are similarly exposed to injury or death in the shower, caused by excessively hot water.

A principal object of this invention is to provide a system to make showers safer when the water temperature rises to a dangerous level from whatever cause.

A further object is to provide a system as described which can reset itself when the water temperature reduces again to a safe level.

Still further objects are to provide a system as described which is substantially foolproof and simple, economical, unobtrusive in appearance, durable and lightweight, and which can be proportioned in manufacture to fit most installations.

BRIEF DESCRIPTION OF THE DRAWINGS

The above and other objects and advantages of this invention will become more readily apparent on examination of the following description, including the drawings in which like reference numerals refer to like parts.

DETAILED DESCRIPTION

Figure 1:
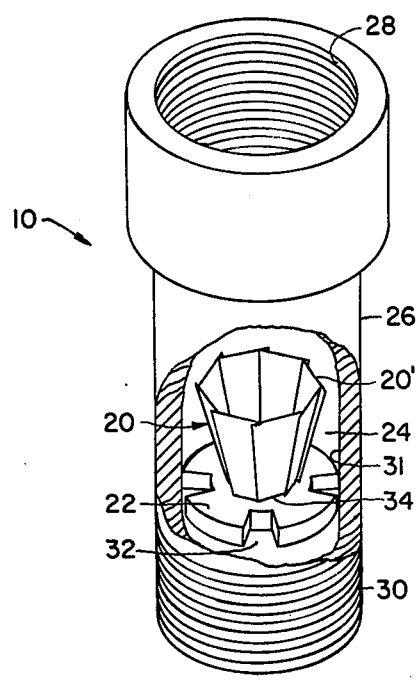
FIG. 1 is a fragmentary perspective diagrammatic view of the invention.
Figure 2:
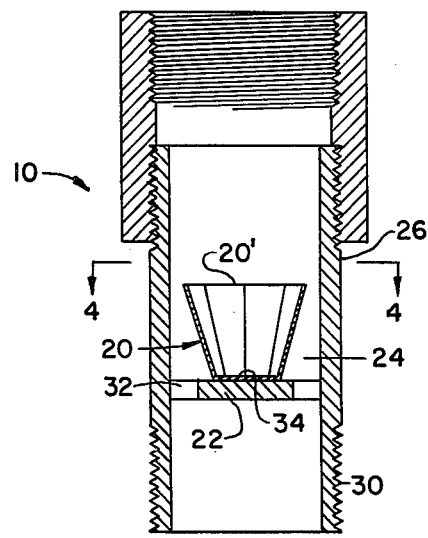
FIG. 2 is side elevational sectional diagrammatic view thereof.

FIGS. 1 and 2 diagram an embodiment 10 of the invention, a thermostatic cup 20 freely resting on a perforate transverse platform 22 fixed across an intermediate portion of the bore 24 of a short length of substantially upright waterpipe 26.

Female pipe-threads 28 at the upper end and male pipe-threads 30 at the lower end provide means of attaching the invention in series with a shower nozzle, upstream from the nozzle.

Water supplied through the system in a shower nozzle passes down around the outside of the thermostatic cup 20, then down through the apertures 32 or perforations in the periphery of the transverse platform outside the base 34 of the thermostatic cup.

When heated, the thermostatic cup 20 expands.

When the water temperature exceeds a predetermined degree at which the thermostatic cup is proportioned to expand against the bore 24 of the pipe 26, this expansion substantially shuts off the flow, but not quite, leaving a trickle flow between the upper perimeter 20' of the cup and the inner wall 31 of the pipe bore.

Figure 3:
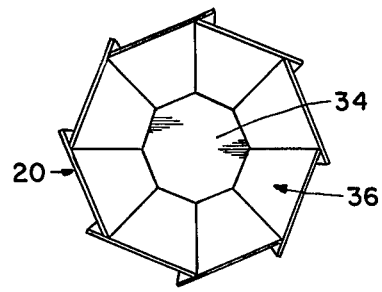
FIG. 3 is a plan view on an enlarged scale of the thermostatic element thereof.

FIG. 3 indicates a suitable shape for the thermostatic cup, with a base 34 and a plurality of overlapping symmetrical trapezoidal-shape petals 36 which may overlap successively in a circumferential direction as shown.

Figure 4:
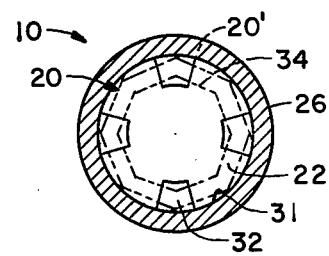
FIG. 4 is a sectional detail adapted from 4—4, FIG. 2.

FIG. 4 diagrams the relation of the base 34 of the thermostatic cup 20 to the transverse platform 22 and of the upper rim 20' of the thermostatic cup to the inner wall 31 of the pipe 26 when nearly closing off the pipe. The thermostatic cup and the apertures or perforations 32 may be proportionally larger as shown in this view, than in the previous views, if desired.

Figure 5:
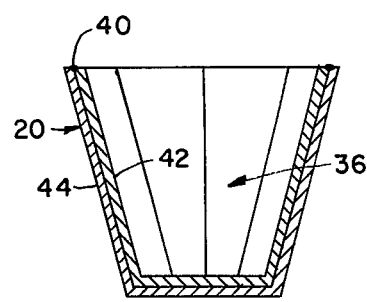
FIG. 5 is a sectional elevational detail on an enlarged scale of the thermostatic element at a first temperature.

FIG. 5 shows in section that the thermostatic cup 20 may be a bi-metallic cup, of inner and outer layers welded together as at 40. Any conventional couple of metals may be used, such as brass 42 and steel 44, making up the pedals 36.

Figure 6:
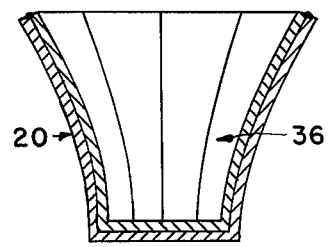
FIG. 6 is a sectional elevational detail of an enlarged scale of the thermostatic element at a second temperature.

FIG. 6 shows that when heated the bimetallic bars or petals 36 bend outward in known manner.

Height of the cup is made greater than inside diameter of the pipe in any case, to prevent tumbling.

Figure 7:
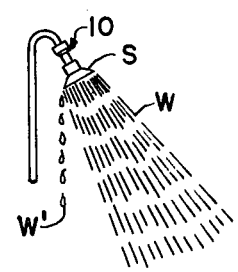
FIG. 7 is an elevational detail on a reduced scale indicating alternative flow modes of a shower apparatus corresponding to two temperatures of the thermostatic element.

FIG. 7 illustrates the self re-setting provision.

Normally, water as in broken lines W pours forth from a shower nozzle S as a full spray.

However, when the invention 10 reduces the flow to prevent scalding a user at a predetermined temperature elevation of the water, the flow is still maintained as a drip shown as full-line droplets W', which even at a manufactured proportion reducing flow at say 110° F., continues until the flow admits cooler water to the thermostatic element as upon restoration of cold water service at a mixing valve, at which time the flow progressively resumes. The mismatch of the polygonal, peripheral shape of the cup in the circular bore of the pipe assures this feature for restoration of flow upon water temperature reduction.

From the above, it will be appreciated that the radially expansible thermostatic valve element or cup is self-centering through venturi effect, and can in no case cover all the opposed four apertures; that it is self-cleaning through scrubbing of the petals over each other and through shifting in being turned on and off, that it is stabile and non-tumbling because the proportions are such as to prevent such, that a drip even at hottest temperatures is assured by the shape, and that the unit can be easily and economically made using ordinary pipe with a metal or a plastic platform force-fitted in it and the thermostatic cup dropped in on top. It will be seen that trimming the height of the cup in manufacture will, for a given I.D. pipe, shift maximum shut-off to a higher temperature range and vice versa, since the thermostatic action is progressive.

This invention is not to be construed as limited to the particular forms disclosed herein, since these are to be regarded as illustrative rather than restrictive. It is, therefore to be understood that the invention may be practiced within the scope of the claims otherwise than as specifically described.

What is claimed and desired to be protected by United States Letters Patent is:

1. A system for preventing scalding of a user of a water shower nozzle, comprising in combination: a length of pipe having a bore, means for connecting the length of pipe in a water supply to a said shower nozzle, a radially expansible thermostatic element for reducing flow of water in proportion to temperature elevation of said water, means freely supporting the thermostatic element for self-centering in said bore, means for assuring automatic reset of said thermostatic element for restoration of flow upon water temperature reduction, said thermostatic element being a thermostatic cup, said means freely supporting comprising a perforate transverse platform in said bore, and said means for assuring automatic reset comprising means for preserving a drip of water past the thermostataic element upon said reduction, including said thermostatic element being polygonal and said bore being circular.

* * * * *